Oct. 31, 1961  W. E. BUCK  3,006,250
SHAFT BEARING ASSEMBLY AND SEALING SYSTEM
FOR HIGH SPEED TURBINES
Filed June 17, 1960 4 Sheets-Sheet 1

INVENTOR.
WILLARD E. BUCK
BY
ATTORNEYS

Oct. 31, 1961 W. E. BUCK 3,006,250
SHAFT BEARING ASSEMBLY AND SEALING SYSTEM
FOR HIGH SPEED TURBINES
Filed June 17, 1960 4 Sheets-Sheet 2

INVENTOR.
WILLARD E. BUCK
BY
ATTORNEYS

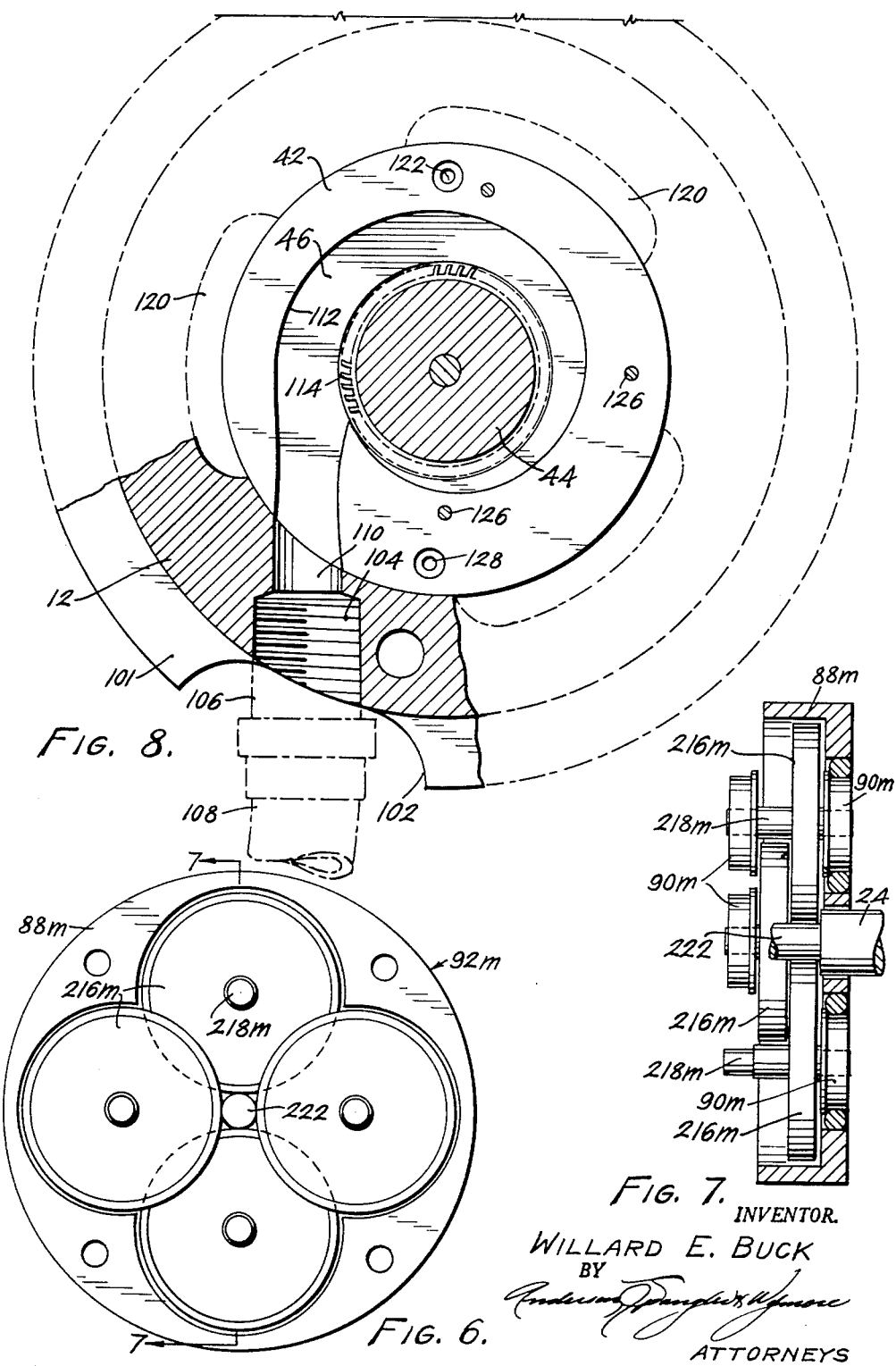

United States Patent Office 3,006,250
Patented Oct. 31, 1961

3,006,250
SHAFT BEARING ASSEMBLY AND SEALING SYSTEM FOR HIGH SPEED TURBINES
Willard E. Buck, Boulder, Colo., assignor to Beckman & Whitley, Inc., San Carlos, Calif., a corporation of California
Filed June 17, 1960, Ser. No. 36,938
16 Claims. (Cl. 88—74)

This invention relates to high speed rotating systems and, more specifically, to gas-driven turbines of a type especially adapted for use as mirror drives in sweeping image cameras to be operated in a vacuum.

In one of my earlier patents, namely U.S. Patent 2,886,285 issued May 12, 1959, I disclose an improved bearing lubrication and cooling system for high speed turbines. Units manufactured in accordance with the teaching of this patent have proven quite satisfactory for general use as mirror drives in high speed photographic equipment. There remains, however, a certain very specialized field of high speed photography for which these turbines are unsuitable due to several problems not ordinarily encountered while recording short-lived events, namely, taking pictures of instantaneous phenomena occurring in the ultraviolet end of the spectrum.

Sweeping-image-type rotating mirror cameras are customarily employed for photographing short-lived events in which the source of light lies in the ultraviolet range of the spectrum. The presence of any appreciable quantity of air within the mirror cavity causes substantial absorption of the useful radiation and the air turbulence results in considerable distortion of the image being reproduced as well as reducing overall camera efficiency. Moderate success had been attained in this specialized field by substituting helium for air as both the driving medium for the turbine and the atmosphere in which the camera functions; however, it has been recognized for some time that the real solution lies in operating the camera in a vacuum of the order of one millimeter of mercury or less. The prior art attempts to build such a camera have, nevertheless, been unsuccessful due primarily to the problem of sealing the lubricant within the turbine so that it does not leak into the mirror cavity and fog the mirror while the camera casing is being evacuated.

It has now been found in accordance with the teaching of the instant invention that it is possible to construct a turbine having a novel vacuum system incorporated therein which functions to prevent the escape of any of the bearing lubricant into the mirror cavity by drawing the air out of the camera casing in counterflow relation to the movement of the oil. Such a turbine is ideally suited for use as a mirror drive for sweeping-image-type cameras adapted to record short-lived events in which the source of illumination lies at the ultraviolet end of the spectrum. The principal advantage of the turbine is, of course, that it, for the first time, makes high vacuum sweeping-image-type cameras a practical reality by eliminating the heretofore insoluble problem of preventing mirror fogging caused by the escape of lubricant into the mirror cavity.

Among the other advantages are the elimination of helium as a necessary source of power in favor of air which is considerably less expensive and more readily obtainable. The high vacuum possible in the mirror cavity produces an overall increase in camera efficiency while preventing distortion of the final image ordinarily caused by air turbulence and absorption of some of the useful ultraviolet radiation. Also, any air that leaks into the camera casing after the camera is in operation is drawn off through the turbine vacuum system in a direction opposite to the flow of lubricant toward the mirror cavity thus providing further assurance that no mirror fog will take place.

Furthermore, the turbine disclosed herein has been designed to include a novel and improved mirror shaft bearing assembly at one end of the mirror shaft by means of which it is possible to effect a considerable reduction in rotational speeds of the bearings compared with that of the shaft. This shaft bearing assembly is primarily designed for use in turbines adapted to operate at speeds not greater than approximately 6,000 revolutions per second and is relatively simple and inexpensive when compared with the pressurized bearings used on the other end of the mirror shaft. The limiting factor in the speeds possible with this improved shaft bearing assembly appears to be the heat resistance of the "Nylon" or "Teflon" tires on the roller wheels of the assembly; therefore, with present materials, rotational speeds in excess of 6,000 r.p.s. or so demand pressurized shaft bearing assemblies on both ends of the mirror shaft.

It is, therefore, the principal object of the present invention to provide a novel and improved high speed turbine of a type especially adapted for use as a mirror drive in sweeping image cameras designed to operate in a vacuum.

A second object is the provision of a turbine of the class described above which incorporates a vacuum system operative to draw air from the camera casing and particularly the mirror cavity in a direction opposite to the flow of bearing lubricant tending to escape into the mirror cavity and fog the mirror.

Another objective is to provide a shaft bearing assembly functioning as a journal for one end of the mirror shaft that is so designed that it enables the ball bearings thereof to turn at a considerably slower speed than the shaft, thus reducing friction, heat and centrifugal action tending to throw the lubricant away from the bearings.

Still another objective of the invention is the provision of an improved pressurized shaft bearing lubrication system that includes a novel centrifugal pump action adapted to circulate the lubricant and keep it in place between the bearing and shaft journalled therein.

Further objects are the provision of a miniaturized gas turbine that is extremely compact, dependable, powerful, versatile, and capable of operating at speeds well in excess of ten thousand revolutions per second.

Other objects will be in part apparent and in part pointed out specifically hereinafter in connection with the description of the drawings that follow, and in which:

FIGURE 6 is an end elevation similar to FIGURE 2 showing a modified form of the ball bearing assembly in which two coplanar pairs of ball bearing sets are mounted one behind the other in diametrical tangent relation to the mirror shaft but in normal relation to one another;

FIGURE 7 is a diametrical section taken along line 6—6 of FIGURE 6; and

FIGURE 8 is a diametrical section to an enlarged scale taken along line 8—8 of FIGURE 1 showing the turbine impeller and associated gas passages, portions having been broken away to conserve space and others shown in section to better reveal the interior construction.

Figure 1:
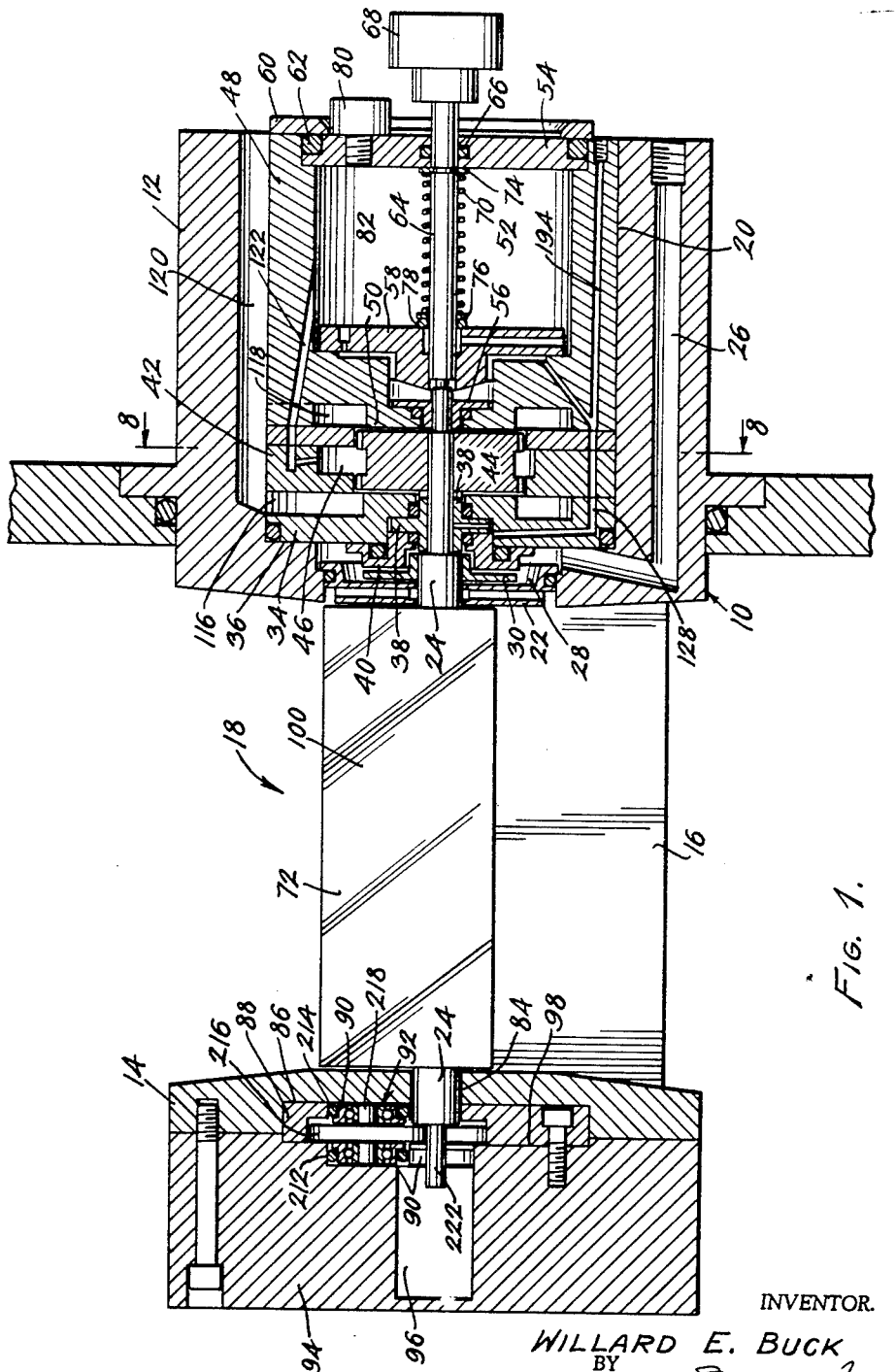
FIGURE 1 is a diametrical section of the gas turbine of the present invention showing the novel lubrication system incorporated therein, the vacuum-operated lubricant seal and the roller bearing assembly that receives the mirror shaft, portions of the housing having been broken away to conserve space.
Figure 2:
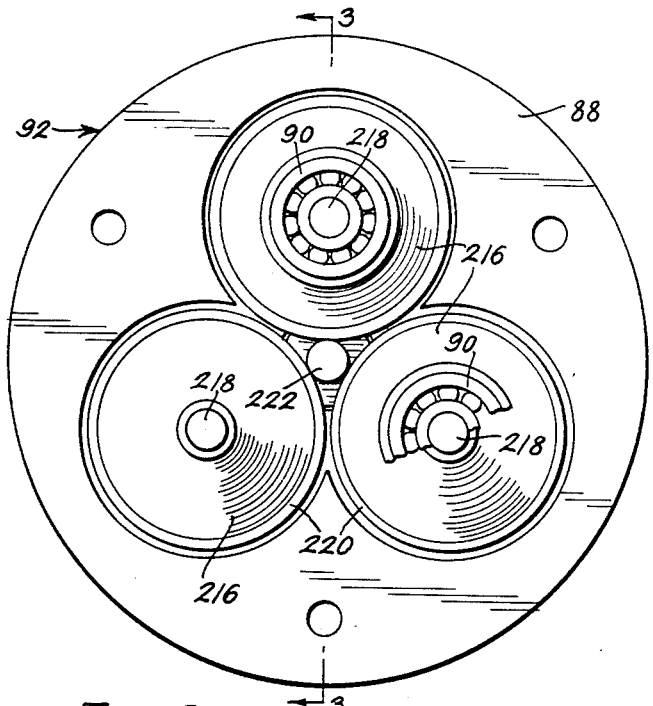
FIGURE 2 is an end elevation to an enlarged scale showing the ball bearing cage with the cover plate removed and three ball races mounted in tangent relation to the mirror shaft and in equiangularly spaced coplanar relation to one another.
Figure 3:
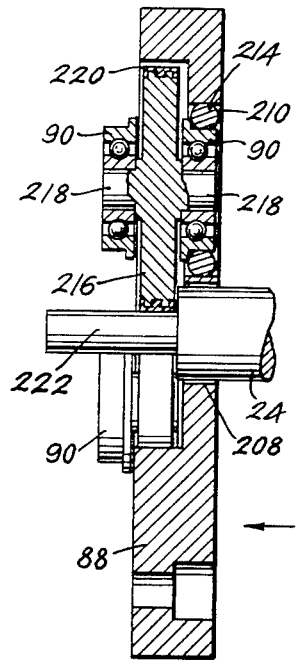
FIGURE 3 is a diametrical section taken along line 3—3 of FIGURE 2.
Figure 4:
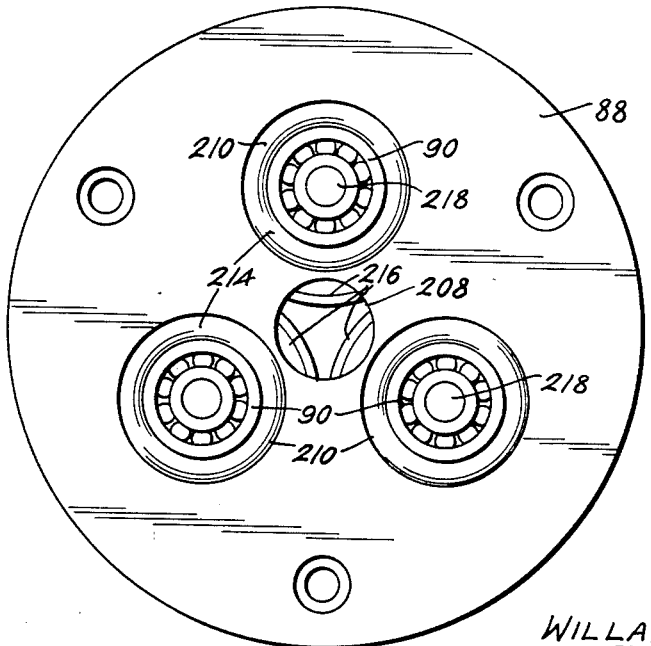
FIGURE 4 is an end elevation of the bearing assembly, similar to FIGURE 2 but from the opposite end as viewed in the direction of arrow 4, FIGURE 3.

Referring now to the drawings for a detailed description of the high speed air-driven mirror turbine of the present invention and, more particularly, to FIGURE 1 for this purpose, it will be seen that the several functional components of the device are mounted within a housing that has been indicated broadly by reference numeral 10 and which includes right and left end portions 12 and 14, respectively, interconnected by an intermediate portion 16 that defines with said end portions a mirror cavity 18. Right end portion 12 of the housing 10 is formed to provide an axial bore 20 into the inner end of which is inserted a generally circular element 22 that loosely receives the right end of the mirror shaft 24. Element 22 cooperates in a manner to be set forth in detail presently with a vacuum passage 26 located in the right end portion and communicating with the axial bore to produce a vacuum-operated seal adapted to prevent the passage of lubricant along the mirror shaft and into cavity 18. A depression 28 is provided in the outer face of element 22 adapted to receive a disk-like member 30 which is attached to the mirror shaft 24 for rotation therewith by means of centrally-located hub portion 32.

Spaced outwardly from element 22, but within the right end portion 12 of the housing 10, is a bearing holder 34 that rests against an outwardly-facing annular shoulder 36 formed by an enlargement of the axial bore 20. This bearing holder 34 has a central opening within which inner mirror shaft bearing 38 is mounted. A retaining ring 40 cooperates with the bearing holder to retain the shaft bearing in place and is located between said bearing holder and disk-like element 30 in spaced relation to the latter. Next is a two-part stator 42 that rests against the outer face of the bearing holder 34 within the axial bore and encompasses the turbine impeller or rotor 44 that is mounted on the mirror shaft for rotation therewith adjacent the inner bearing but spaced outwardly therefrom. The two-part stator and a generally cylindrical rotor cooperate with one another to define a gas-intake passage 46 located therebetween of steadily decreasing cross-sectional area from its point of emergence into the bore from the housing where it is connectable to a source of high pressure air, as will be explained presently in connection with the description of FIGURE 8.

A generally cup-shaped element 48 is located within the outer end of the axial bore 20 with its flat bottom portion 50 on the left resting against the adjacent face of the stator and the cylindrical depression 52 therein opening outwardly toward the right. This cup-shaped element performs several functions, among which are those of a reservoir for the lubricant when coverplate 54 is attached in place upon the open end or top thereof, as a holder for the outer mirror shaft bearing 56 which is located within a central opening provided for this purpose, and as a holder for bearing retaining member 58 that maintains the outer shaft bearing in place and also feeds the lubricant to the latter. Coverplate 54 is held in fluid-tight sealed position over the open top or end of cup-like element 48 by an endplate 60 that cooperates with the latter and with said coverplate to define an annular passage adapted to receive O-ring seal 62. A shaft 64 arranged coaxially with the mirror shaft 24 is mounted for rotation within coverplate 60 and a conventional fluid-tight O-ring seal is maintained therebetween as indicated by reference numeral 66. A control knob 68 is attached to the outer extremity of shaft 64 for the purpose of urging said shaft inwardly in opposition to compression springs 70 until it engages the mirror shaft 24 and enables the mirror 72 to be turned manually within cavity 18. Spring 70 is mounted between a fixed abutment 74 located on shaft 64 adjacent the inner face of coverplate 54, and a movable abutment 76 which is urged by said spring against an O-ring 78 that forms a fluid-tight seal around shaft 64 where it passes through the central opening in the retaining element 58 for the outer shaft bearing. A threaded stopper 80 is provided in coverplate 54 for the purpose of introducing lubricant into the reservoir 82 defined by the cup-shaped member 48, retaining member 58 and said coverplate.

Still with reference to FIGURE 1, the left end portion 14 of the housing 10 will be seen to include a central opening 84 in axial alignment with the central bore 20 of the right end portion 12 and sized to loosely receive the other or left end of mirror shaft 24 for rotational movement. In addition, left end portion 14 is provided with a shallow cylindrical depression 86 adapted to receive the cage 88 in which are mounted the several sets of ball races 90 that comprise elements of the bearing assembly, designated broadly by numeral 92, in which the left end of the mirror shaft 24 is journalled. An endplate 94 is bolted or otherwise attached to left end portion 14 in position to cover the exposed roller bearings 90, mirror shaft 24 and cage 88, suitable depressions 96 and 98 being provided in the inner face of said endplate for this purpose.

Finally, it can also be seen in FIGURE 1 that the intermediate portion 16 of the housing 10 is located eccentrically thus leaving the center open for rotation of the mirror 72 within cavity 18. In other words, portion 16 merely holds the two end portions together and the entire housing is customarily fabricated from a single block of metal. Similarly, the mirror 72 along with its shaft 24 are machined from a single piece of material, the axis of the shaft passing through the center of mass of the mirror which is usually designed to provide an equilateral triangular cross-section of uniform area with at least one plane polished face 100 adapted to reflect an image focused thereon back out through cavity 18 and onto the film (not shown).

Figure 5:
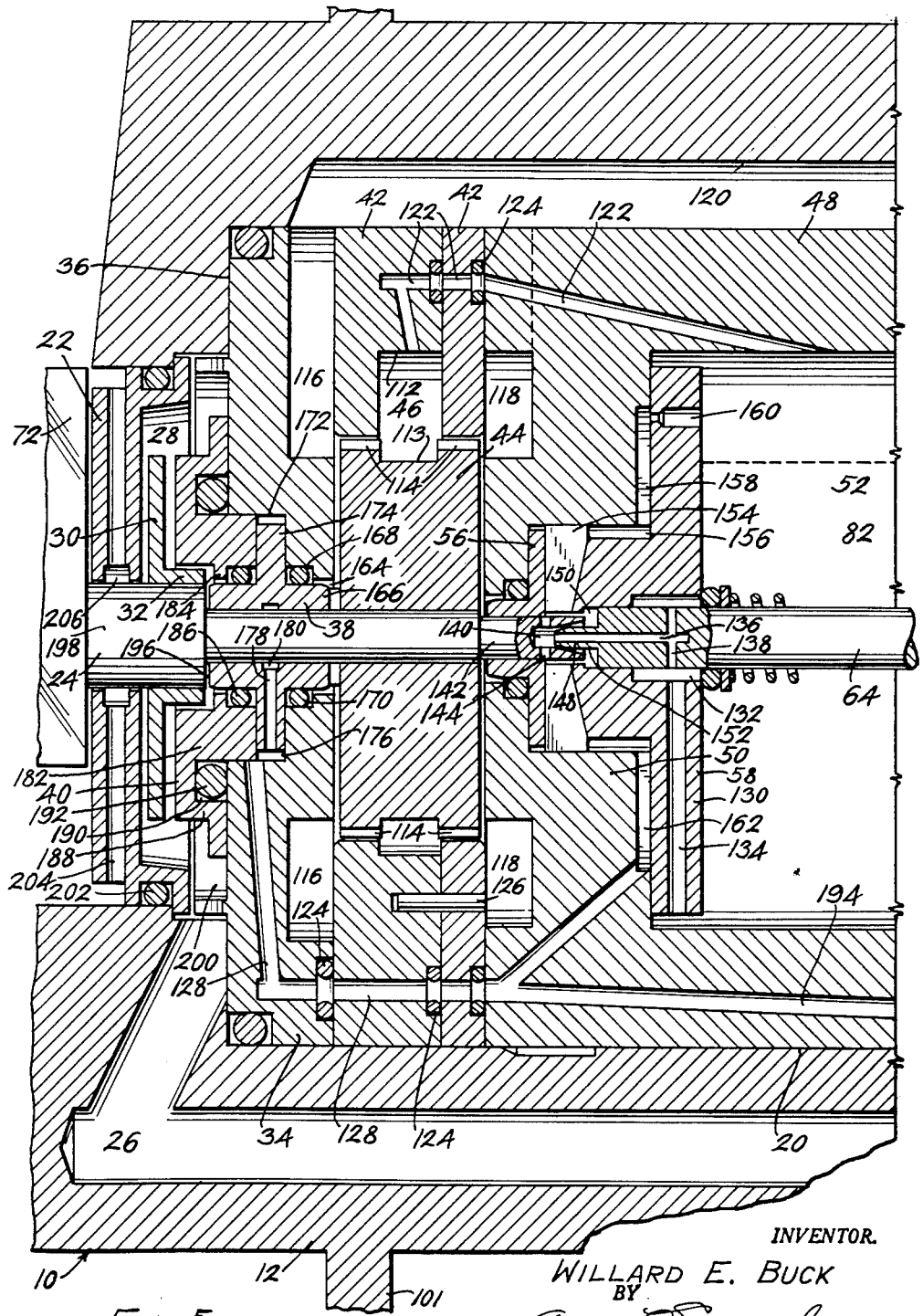
FIGURE 5 is a fragmentary diametrical section to an enlarged scale showing the details of the lubrication system, vacuum-operated lubricant seal, turbine impeller and pressurized bearing assembly within which one end of the mirror shaft is journalled.

Next, it would perhaps be well to consider the details of construction found in the turbine rotor and stator in connection with FIGURES 5 and 8 as a preface to a complete description of the lubrication and vacuum-operated assemblies. The right end portion 12 of the housing 10 includes an annular flange 101 which is cut-away as at 102 and provided with an internally-threaded socket 104 adapted to receive a threaded male connector 106 on the end of a gas inlet line 108 (dotted lines in FIGURE 8) that is attached to a source of high pressure gas (not shown) such as air. A short gas passage 110 interconnects the socket 104 with gas intake passage 46 that opens onto the cylindrical edge of the two-part stator 42 as shown in FIGURE 8. As aforementioned, gas intake passage 46, when considered in combination with the rotor 44 that is centrally located within the stator, enters substantially tangentially to the rotor and decreases more or less uniformly in cross-sectional area as it encircles the latter due to the convergence of spiral-shaped wall 112. Thus, the gas entering passage 46 within the two-part stator is directed inwardly while the velocity thereof remains substantially constant as it circulates around the stator 44 and is discharged through the blades of the rotor. The stator includes a centrally located annular groove 113 opening onto the intake passage 46 of the stator and corresponding generally thereto insofar as width is concerned. Bordering the groove on both sides are two annular series of curved turbine blades 114 completely encircling the rotor and interconnecting the intake passage 46 with exhaust cavities 116 and 118, located respectively in the adjoining faces of bearing retainer 34 and the flat bottom portion 50 of cup-shaped element 48. These exhaust cavities 116 and 118, in turn, connect with exhaust passages 120 in the right end portion 12 of the housing that are open to the atmosphere. Thus, the high-pressure gas from intake line 108 passes through the housing by means of socket 104 and passage 110 into the intake passage 46 of the stator where it circulates around the annular groove 113 of the rotor and expands outwardly across the blades 114 into the exhaust system 116, 118 and 120 for release to the atmosphere. This, of course, causes the rotor to turn within the stator and spins the mirror 72 at exceedingly high speeds.

Now, continuing the detailed examination of FIGURES 5 and 8, the lubrication system for the bearings 38 and 56 located in the right end portion 12 of the housing will now be described. To begin with, a passage 122 passing through both elements of the stator and cup-shaped element 48 interconnects the reservoir 82 in the latter with intake passage 46 of the former. Suitable O-ring seals 124 are located between the adjacent faces of the stator elements and between the stator and cup-shaped element to prevent the escape of air and resultant pressure loss. Passage 122 opens into the top of the reservoir and thus provides means for pressurizing the liquid lubricant contained therein as a portion of the incoming high pressure gas is bled off from the stator ahead of the exhaust system. Aligning pins 126 are provided at various points interconnecting the two parts of the stator for the purpose of maintaining the sections of passage 122, and also passage 128 to be described presently, in proper register with one another.

As in FIGURE 5, bearing retainer 58 is fabricated to provide a disk-like portion 130 having a diameter slightly less than the interior of cup-shaped element 48 and a centrally-located cavity 132 of a diameter larger than that of shaft 64 which is open to receive the lubricant from the reservoir by means of radial passage 134 communicating said cavity with the bottom edge of said disk-like portion. Accordingly, the air pressure exerted within the reservoir on top of the lubricant forces the latter between the edge of the disk-like portion 130 and the adjoining wall of cup-like element 48, up through radial passage 134, and into cavity 132 where it can circulate around shaft 64. Shaft 64, on the other hand, contains an axial passage 136 opening onto the tapered inner end 148 thereof and connecting with cavity 132 in the bearing retainer by means of one or more intersecting passages 138. Thus, the lubricant can pass inwardly through the passage 136 in the center of shaft 64 to the flared socket 140 in the outer end section 142 of mirror shaft 24. The lubricant within the socket 140 is whirled outward centrifugally through radial ports 144 onto the interior surface of outer bearing 56 providing lubrication for the outer end portion 142 of the mirror shaft which is journalled for rotation therein. The centrifugal pump action between the inner and outer ends of radial ports 140 is such that differential pressures as high as 100 p.s.i.a. have been measured thus providing adequate liquid pressure for lubricating the inner shaft bearing 38. From ports 144, the lubricant moves along shaft 24 and into annular space 150 provided between the wall surrounding the axial bore through the bearing retainer and the exterior surface of the reduced section 152 on the inner extremity of shaft 64. Then from annular space 150, the lubricant is forced outwardly and into the spaces provided between the radial vanes 154 on the inner end of the bearing retainer 58 that communicates with a second annular space 156 defined by the outside surface of said retainer and the adjacent surface of the cup-shaped element. A passage 158 above the shaft located between the adjacent faces of the retainer and cup-shaped element connects annular space 156 with exhaust port 160 in the retainer that opens into the reservoir 82 above the level of lubricant therein. These passages cooperate with one another to return the air and oil dispersed therein to the reservoir.

At this point it should be mentioned that the turbine construction illustrated and described herein where shaft bearings 38 and 56 are located on both sides of the turbine rotor is preferred for those units designed to operate within the upper range of possible speeds such as, for example, 15,000 r.p.s. and higher, due to the possibility that the unsupported sections of the shaft will develop a whip action; however, in those turbines intended for use within the mid and low-speed ranges, the bearing 56 journalling the free end of the mirror shaft along with its associated retaining element and lubrication passages can be eliminated in favor of a construction wherein a single shaft bearing such as inner bearing 38 is force-lubricated directly from reservoir 52. On the other hand, elimination of outer bearing element 56 while retaining the other elements of the outer shaft bearing assembly also has certain advantages insofar as preserving the beneficial centrifugal pump action as the lubricant is whirled onto the surface of the mirror shaft for purposes of forced lubrication of bearing 38.

Another passage 162 similar to passage 160, but located underneath the mirror shaft and associated elements, connects into passage 128 that delivers the lubricant through the cup-shaped element 48, both elements of the stator 42, and bearing holder 34 to the inner mirror shaft bearing 38. In other words, the air and any oil entrained therein is forced into the top of the reservoir through the disk-shaped portion of the cup-shaped element; whereas, more oil from the reservoir is fed to the inner mirror bearing by means of inner annular space 150, the openings between the radial vanes 154, outer annular space 156, passage 162, and passage 128 that opens onto the inner face of the bottom portion 50 of cup-shaped element 48, then passes through both parts of the stator 42 and finally emerges through the bottom of the central opening in bearing holder 34. Here again, O-ring seals 124 are provided between the adjacent faces of the stator, cup-shaped element and bearing holder.

Bearing holder 34 has the outer face thereof cut away as shown to define exhaust cavity 116 with the adjacent inner face of the stator and the wall surrounding the axial bore in the right end portion of the housing. A central opening 164 is provided in the bearing holder 34 adapted to pass the mirror shaft and also receive the hub portion 166 of inner shaft bearing 38. A first annular enlargement 168 of the central opening 164 in the bearing holder provides a recess for O-ring 170 located between said holder and the hub portion of the inner bearing. A second annular enlargement 172 of the central opening in the bearing holder provides a shoulder against which annular flange 174 emanating from the center of the hub portion of the inner bearing rests. The diameter of flange 174 is slightly less than the diameter of the second annular enlargement 172 in the holder thus providing an annular cavity 176 for the circulation of lubricant entering said cavity from passage 128. The lubricant is conducted to the inside of the inner bearing by means of a radial passage 178 through the annular flange 174 that connects cavity 172 with an inner annular cavity 180 formed inside the hub portion surrounding the mirror shaft.

The retainer 40 for the inner shaft bearing 38 includes a centrally-located tubular portion 182 sized to loosely receive the hub portion 166 of the inner bearing and also fit into the second annular enlargement 172 of the central opening in the bearing holder as a means for holding the bearing in place therein by engaging the annular flange of the latter. An annular flange 184 on the interior surface of the tubular portion of the retainer provides a recess on the right side thereof for the reception of an O-ring 186 and on the left side a cavity adapted to receive the hub portion 32 of disk-like member 30 in spaced relation. A circular flange portion 188 encircles the tubular portion 182 of the retainer at the inner end thereof and is provided with an annular groove 190 for the reception of an O-ring 192 adapted to seal against the adjacent inner face of the bearing holder 34.

Thus, means are provided for circulating the lubricant between the hub portion of the inner bearing and the mirror shaft. The lubricant is, of course, maintained under a relatively high pressure by the centrifugal pump action produced at the free end 142 of the mirror shaft. Any of the lubricant that moves along the mirror shaft past the hub portion of either bearing in the direction of the turbine rotor can escape through the exhaust system that includes cavities 116, 118, and 120; however, in a shaft bearing 38 provides a vacuum seal adapted to prevent the escape of air from within the turbine cavity into depression 28 by reason of the oil seal maintained between said bearing and the mirror shaft. Also, O-rings 170, 186 and 192 cooperate with the inner bearing to maintain the vacuum seal. The centrifugal action of the shaft and rotor mounted thereon along with the flow of exhaust gas will remove the lubricant from the system when it emerges into the rotor cavity in the stator. The vacuum-operated system by means of which the lubricant is kept out of the mirror cavity will now be described; however, before doing so, it will be well to mention the function of branch passage 194 in the cup-shaped element 48 that connects into passage 128 which feeds lubricant to the inner bearing. This passage 194 is for the sole purpose of connecting a gage into the lubrication system to be sure that the lubricant is flowing to the bearings at the proper pressure.

Still with reference to FIGURE 5, it can be seen that the lubricant which moves inwardly toward the mirror between the shaft and hub portion of the inner bearing 38, will emerge first into the space 196 provided between the inner or left hand face of the bearing hub portion 166 and the adjacent face formed by the hub portion 32 of disk-like element 30 and the enlargement 198 of mirror shaft 24. The shaft and disk-like element 30 turn as a unit at a high rate of speed which tends to discharge the lubricant centrifugally toward the periphery of the assembly along the outer face of said disk. The lubricant that reaches the edge of the disk-like element is whirled off against the outwardly flared frusto-conical surface of depression 28 in element 22 where it is withdrawn through vacuum passage 26 that opens into the annual chamber 200 which surrounds the retainer for the inner bearing and communicates with said depression. An O-ring 202 located in a suitable annular groove around the periphery of element 22 seals against the wall surface of the axial bore in the right end portion of the housing, thus preventing the passage of oil therebetween into the mirror cavity.

Before proceeding with the detailed description of the vacuum-operated sealing system of the instant turbine that functions to prevent the escape of lubricant into the mirror cavity, it would, perhaps, be advisable to digress briefly and explain the pressure relationships existing within the camera casing and turbine that cause this difficulty and thus necessitate such a system. First of all, at such time as the air has been evacuated from the camera casing and the turbine casing down to an absolute pressure of say 10 mm. of Hg or less, little chance remains for the lubricant to be drawn into the mirror cavity as the rapidly turning disk-like member or flinger 30 on the mirror shaft cooperates with the frusto-conical depression 28 in the outer face of element 22 to deliver any lubricant escaping inwardly from the inner shaft bearing 38 into vacuum passage 26 where it is removed. Also, any air that happens to leak into the camera casing once it has been evacuated is, likewise, no particular problem because it is drawn into the turbine vacuum system from the mirror cavity in counterflow relationship to any lubricant tending to escape into said cavity and is exhausted to the atmosphere along with the lubricant. The critical period, therefore, is while the camera casing is being pumped down with the turbine in operation.

When the air is being evacuated from the camera casing, a more negative pressure may exist in the mirror cavity than inside the turbine casing causing the lubricant as well as the air to be sucked along the mirror shaft in the direction of the mirror. This disadvantageous pressure differential is further enhanced by the localized negative pressure condition existing immediately adjacent the mirror as it turns at exceedingly high speeds, flinging the air away with a fan or paddle-action. Accordingly, means must be provided within the turbine assembly that are adapted to alter this pressure differential to an extent whereby the lubricant is no longer drawn into the mirror cavity.

For this purpose, the pressure within chamber 200 is maintained by means of vacuum passage 26 at an even lower level than that existing at the outer edges of the mirror in the mirror cavity 18, and radial passages 204 are provided in element 22 that open into an annular groove 206 positioned in the interior of the latter element. When this is done, a portion of the air that is being moved in cavity 18 from the low pressure zone adjacent the shaft to the high pressure zone at the mirror edges by the action of the mirror, re-enters the right hand portion of the housing through radial passages 204 where it is drawn or sucked to the left along the shaft into the low pressure zone of cavity 18 and to the right underneath element 22 in counterflow relation to any of the lubricant tending to escape into the mirror cavity by this route. This, of course, provides an effective vacuum-operated seal between the mirror shaft and element 22 caused by the higher pressure within the annular chamber 206 than exists in the mirror cavity 18 or in evacuated cavity 200.

Reference will now be had to FIGURES 1, 2, 3 and 4 of the drawing for a description of the ball bearing assembly 92 located in the left end portion 14 of the housing that carries the other end of the mirror shaft 24. As already mentioned, a central opening 84 is provided in the left end portion 14 in coaxial relation to the axial bore in the right end portion and sized to loosely receive the left end of the mirror shaft for rotation therein. A cylindrical cavity or depression 86 is provided in the outer or lefthand face of the left end portion adapted to receive the bearing cage 88. The bearing cage is provided with a central opening 208 of substantially the same size as opening 84 in the left end portion with which it is axially aligned. Three ball race openings 210 are positioned around the central opening with their centers the same radial distance therefrom and an equal distance from one another. The endplate 94 which is bolted or otherwise attached to the outer or lefthand face of the left end portion 14 contains three ball race cavities 212 (FIGURE 1) corresponding to the openings 210 in the cage and adapted to register with the latter in assembled relation. Each of the cavities 212 in the endplate and each opening 210 in the cage is provided with a ball race 90 surrounded by an O-ring 214. A roller wheel 216 of greater diameter than the O-ring 214 is located between each pair of axially aligned ball races with its center shaft 218 journalled for rotation therein. The periphery of the roller wheel is preferably provided with a plastic tire 220 adapted for rolling engagement with the reduced section 222 on the end of the mirror shaft 24.

When three roller wheels are used in the same plane, which is the construction illustrated in FIGURES 1–4, inclusive, it can be shown mathematically that the maximum possible ratio of radii of the roller wheels and mirror shaft before the roller wheels touch one another is approximately 6.46:1 computed in accordance with the following equation:

$$R_s = \frac{2R_r\sqrt{3} - 3R_r}{3}$$

where $R_s$ is the radius of the mirror shaft and $R_r$ is the radius of the roller wheels. Accordingly, the diameter of the roller wheels should be selected so as to not exceed the diameter of the mirror shaft by more than approximately six times if three wheels are to be used in coplanar relation. Similarly, if:

$$\frac{R_r}{R_s}\max.=\frac{6.46}{1}$$

then the roller wheels will turn a maximum of 1/6.46 slower than the mirror shaft, the latter figure being the ratio of their circumferences as follows:

$$\frac{C_s}{C_r}=\frac{2\pi R_s}{2\pi R_r}=\frac{R_s}{R_r}$$

where $C_s$ is the circumference of the mirror shaft and $C_r$ is the circumference of the roller wheels. Thus, with the mirror shaft turning at a rate of 3,000 revolutions per second, the roller wheel shafts can turn within the roller races at a rate of slightly less than 600 r.p.s. which considerably prolongs the life of the bearings, reduces heat, simplifies lubrication, and otherwise improves the system.

In the preferred embodiment of the invention, the roller race openings 210 in the cage and the corresponding roller race cavities 212 in the endplate are offset radially in the direction of the mirror shaft axis from the theoretical axis of the roller wheel shafts. As a result, the outside of the O-rings 214 are loaded radially inward which, in turn, loads the roller races and preloads the roller wheels causing the latter to press tightly against the mirror shaft. The roller bearing assemblies 90 are packed with a suitable bearing grease and would preferably be of the sealed type to insure against the passage of lubricant into the mirror cavity along the mirror shaft from the left end portion.

Finally, with reference to FIGURES 6 and 7 of the drawings, the modified form of roller bearing assembly 92m that can be used as a journal for the left end of the mirror shaft will be described. As has already been explained in considerable detail in connection with FIGURES 2, 3 and 4, the construction that utilizes three roller wheels arranged in coplanar relation is somewhat limited in that the maximum reduction in speed from the mirror shaft to the roller wheel shafts is approximately 6:1. While this degree of speed reduction has been found entirely adequate for the slower operating speeds, it is conceivable that the occasion may arise wherein an even greater speed reduction is desirable such as, for example, in the mid-range of speeds of the order of 5000 revolutions per second. In order to achieve a greater reduction in speed between the mirror and roller wheel shafts, it is necessary to modify the bearing cage 88m to accommodate four roller wheels 216m and four pairs of roller races 90m as shown most clearly in FIGURE 6. Two of the roller wheels are mounted in the same plane but in diametrical relation to one another on opposite sides of the mirror shaft. The remaining two roller wheels are mounted in coplanar diametrical relation to one another as were the first pair but in a second plane lying behind the plane of the first pair as shown in FIGURE 7. Also, the second pair of roller wheels is shifted angularly 90° relative to the first pair such that the mirror shaft is supported thereon at four equiangularly spaced points. From an examination of FIGURE 6, it will become apparent that with this construction, the roller wheels of one pair can overlap those of the second pair, thus enabling wheels of considerably larger diameter to be used irrespective of the diameter of the mirror shaft. It follows, therefore, that the speed reduction accomplished between the mirror shaft and the roller wheel shafts may easily exceed the 6:1 practical limit of the construction shown in FIGURES 2, 3 and 4. Of course, the left end portion of the housing, the cage 88m and the endplate would have to be enlarged to accommodate the oversized roller wheels.

In the particular form shown, the roller races 90m are arranged in two spaced parallel planes containing four races in each plane. The roller wheel shafts 218m must be lengthened on one side or the other to reach the inner race of the corresponding ball bearing when the illustrated construction is employed. In other respects, the ball bearing assembly 92m is substantially identical to that already described except for the changes in size and arrangement of the various components necessary to accommodate the four roller wheels and right ball races.

As has already been mentioned briefly, at shaft speeds substantially in excess of 5,000 revolutions per second, the plastic tires 220 on the roller wheels are likely to become overheated; therefore, in the high speed range (7,500 r.p.s. and above) the ball bearing assembly 92 in the left end portion of the turbine housing is preferably replaced by a pressurized shaft bearing assembly such as that provided in the right end portion which is capable of operation at shaft speeds approaching 20,000 r.p.s.

Having thus described the several useful and novel features of turbine bearing assembly and associated lubrication and oil sealing systems therefor that comprise the instant invention, it will be apparent that the many worthwhile objectives for which they were developed have been achieved. Although only two specific embodiments of the invention have been illustrated and described in connection with the accompanying drawings, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. A gas-driven turbine of a type particularly suited for use in turning a mirror in a high-speed camera operated at a negative pressure which comprises, a housing having a longitudinal bore and a side-opening mirror cavity communicating with said bore and separating said housing into right and left end portions, right and left shaft bearing assemblies mounted respectively in the right and left end portions of the housing providing journals for a shaft mounted for rotation therein, a mirror shaft journalled for rotation within the right and left shaft bearing assemblies and including at least one polished mirror-forming surface visible through the mirror cavity, a turbine rotor having a bladed periphery attached to the mirror shaft for rotation therewith inside the right end portion of the housing, a turbine stator mounted within the right end portion of the housing in surrounding relation to the turbine rotor and cooperating therewith to define a gas intake passage open at one end to receive gas from a high pressure source thereof and deliver it substantially tangentially to the bladed periphery, said turbine stator also cooperating with the right shaft bearing assembly to define therewith at least one exhaust passage connected to receive exhaust gases from the turbine rotor and deliver them to the atmosphere, means for delivering lubricant under pressure to at least the right shaft bearing assembly of the right and left shaft bearing assemblies, said lubricant cooperating with the right shaft bearing assembly and the mirror shaft to define a vacuum seal located between the exhaust passage and mirror cavity that effectively prevents the flow of gas therebetween, flinger means attached to the mirror shaft for rotation therewith in at least the right end portion of the housing between the right shaft bearing assembly and the mirror cavity, said flinger means being adapted to receive lubricant escaping from the bearing assembly along the mirror shaft in the direction of the mirror cavity and direct it centrifugally into the wall of the bore, cover-forming means attached within the bore between each flinger means and the mirror cavity, said cover-forming means including a central opening adapted to loosely receive the mirror shaft and at least one passage connected to receive gas from within the mirror cavity at a point displaced radially from the mirror shaft and deliver it to said central opening, and vacuum conduit-forming means opening onto the periphery of each flinger means between the adjacent shaft bearing assembly and cover-forming means, said vacuum conduit-forming means being adapted upon connection to a negative pressure source to withdraw lubricant from the housing before it enters the mirror cavity and also to suck gas from the mirror cavity into the passage in the cover-forming means and along the mirror shaft in counterflow relation to any lubricant moving along said shaft in the opposite direction that has passed the flinger means thus effectively preventing said escaping lubricant from fogging the mirror.

2. The gas-driven turbine as set forth in claim 1 in which at least the right shaft bearing assembly includes inner and outer shaft bearings journalling the mirror shaft at longitudinally spaced points, the inner and outer shaft bearings of the right shaft bearing assembly being located on opposite sides of the turbine rotor.

3. The gas-driven turbine as set forth in claim 1 in which the turbine housing includes a lubricant reservoir, a branch passage connected to receive high pressure gases from the inlet passage and deliver them into the top of the reservoir for pressurizing the lubricant, and liquid-carrying conduit means connected to receive lubricant from the reservoir and deliver it to at least the right shaft bearing assembly.

4. The gas-driven turbine as set forth in claim 1 in which the cover-forming means includes a frusto-conical depression opening toward the flinger means, and the flinger means comprises a disk mounted for rotation within the frusto-conical depression in the cover-forming means.

5. The gas-driven turbine as set forth in claim 1 in which the left bearing assembly comprises at least three roller wheels arranged in equi-angularly spaced tangent relation around the mirror shaft, said roller wheels each including a central shaft projecting from both sides thereof, and bearings mounted in the left end portion of the housing providing journals for both ends of each roller shaft.

6. The gas-driven turbine as set forth in claim 1 in which, the turbine rotor includes two continuous annular rows of blades separated by an annular groove, the turbine stator has the inside surface thereof grooved to correspond with the annular groove on the periphery of the rotor and cooperates therewith to define the gas intake passage which decreases in cross-sectional area between the inlet and outlet ends thereof, and the right end portion of the housing includes a passage therethrough, the inlet end of which is connectable to a source of high pressure gas and the outlet end opens into the bore in registry with the inlet end of the gas intake passage.

7. The gas-driven turbine as set forth in claim 1 in which, the intake end of the exhaust passage is branched and connected to receive gases exhausted from both sides of the turbine rotor.

8. The gas-driven turbine as set forth in claim 1 in which, the turbine rotor is spaced from the right shaft bearing assembly to define therebetween a cavity opening into the exhaust passage and adapted to deliver lubricant thereto from said bearing assembly.

9. The gas-driven turbine as set forth in claim 2 in which at least the right shaft bearing assembly includes bearing holders mounted within the housing and adapted to maintain the inner and outer shaft bearings in place, the bearing holders of the right shaft bearing assembly cooperating with the turbine stator to define inlet ends to the exhaust passage connected to receive exhaust gases from both sides of the turbine rotor.

10. The gas-driven turbine as set forth in claim 2 in which the means for delivering lubricant to at least the right shaft bearing assembly includes lubricant-carrying passages connected to deliver fluid to at least the inner and outer shaft bearings of said right shaft bearing assembly.

11. The gas-driven turbine as set forth in claim 5 in which, the left bearing assembly includes three roller wheels arranged in a common plane with their axis of rotation angularly spaced from one another approximately 120°, the outside diameters of said roller wheels being substantially equal and of a magnitude not greater than approximately six times the diameter of the mirror shaft at the points of contact therewith.

12. The gas-driven turbine as set forth in claim 5 in which, the left bearing assembly includes two pairs of roller wheels arranged in two planes located in spaced substantially parallel relation to one another, one pair of said roller wheels being mounted in each plane positioned diametrically opposite one another such that their points of tangency with the mirror shaft are spaced apart angularly approximately 180°, the two pairs of roller wheels being arranged relative to one another such that planes including the mirror shaft axis and the axes of both roller wheels of each pair will intersect one another in substantially normal relation.

13. The gas-driven turbine as set forth in claim 5 in which, the left end portion of the housing includes a cavity sized to receive each bearing of the left bearing assembly, said cavity being located such that the center of the bearing positioned therein will be displaced radially in the direction of the mirror shaft axis relative to the associated roller wheel axis thereby preloading said roller wheels against said mirror shaft.

14. The gas-driven turbine as set forth in claim 10 in which the lubricant-carrying passages comprise a first passage connected to receive fluid from the source thereof and deliver it to a free end of the mirror shaft, a second passage within said free end of the mirror shaft opening onto the surface thereof adjacent the outer shaft bearing and connected to receive lubricant from the first passage, and a third passage connected to receive fluid from the second passage where it opens onto the surface of the mirror shaft and deliver it to the inner shaft bearing.

15. The gas-driven turbine as set forth in claim 12 in which the roller wheels in each pair are of approximately the same diameter and of a size such that the wheels of one pair overlap those of the other pair.

16. The gas-driven turbine as set forth in claim 14 in which a fourth lubricant-carrying passage is connected to receive lubricant from the second passage and return it to the source.

No references cited.